United States Patent [19]

Creekmore et al.

[11] 4,289,666
[45] Sep. 15, 1981

[54] ADHESIVE CORRECTION COMPOSITION AND METHOD OF USE

[75] Inventors: Fred M. Creekmore; Dorothy J. Kennair; Benjamin F. Livingston; James F. Martone; Joseph J. Sabad, all of Lexington, Ky.

[73] Assignee: International Business Machines Corporation, Armonk, N.Y.

[21] Appl. No.: 105,676

[22] Filed: Dec. 20, 1979

[51] Int. Cl.³ .................. C08L 23/06; C08L 91/00; B41J 29/16

[52] U.S. Cl. .................. 260/23 H; 260/28.5 A; 260/28.5 AV; 400/696; 400/697; 428/914

[58] Field of Search ....... 260/23 H, 28.5 A, 28.5 AV; 400/696, 697; 428/914

[56] References Cited

U.S. PATENT DOCUMENTS

| | | | |
|---|---|---|---|
| 3,318,977 | 5/1967 | Battersby et al. | 260/28.5 AV |
| 3,321,427 | 5/1967 | Tyran | 260/28.5 AV |
| 3,876,454 | 4/1975 | Snell et al. | 428/355 |
| 3,924,728 | 12/1975 | Brown et al. | 400/696 |
| 3,942,621 | 3/1976 | MacKarlan | 428/914 |
| 3,944,695 | 3/1976 | Kosaka et al. | 428/914 |
| 4,085,838 | 4/1978 | Pierce | 400/696 |
| 4,175,977 | 11/1979 | Heaton et al. | 260/28.5 AV |
| 4,180,490 | 12/1979 | MacLean | 260/28.5 AV |

FOREIGN PATENT DOCUMENTS 2405069 8/1974 Fed. Rep. of Germany ..... 260/28.5 AV
1253666 11/1971 United Kingdom ....... 260/28.5 AV Applicant has submitted a listing of 69 documents in this application which have been considered by the examiner. The listing is not being published because of its length but is of record in the patent file.

*Primary Examiner*—Ronald W. Griffin
*Attorney, Agent, or Firm*—Pollock, Vande Sande & Priddy

[57] ABSTRACT

Low tack pressure sensitive compositions containing polyethylene, a tackifier, an isobutylene polymer, a copolymer of ethylene and/or propylene and a monoethylenically unsaturated ester and a carboxylic acid and/or ester thereof and use thereof to remove erroneously typed images from a substrate.

31 Claims, No Drawings

ADHESIVE CORRECTION COMPOSITION AND METHOD OF USE

DESCRIPTION

TECHNICAL FIELD

The present invention is concerned with low tack pressure sensitive compositions which are suitable for removing erroneously typed characters from a substrate and is also directed to the use of such compositions for such purposes. The compositions of the present invention are especially adapted for use in conjunction with typewriter ribbons of the type that are coated with a nonabsorbent and substantially noncompressible ink. The low tack pressure sensitive lift-off correction elements of the present invention are preferably in the form of a tape wound upon itself and especially adapted for use in conjunction with a ribbon feed mechanism of a typewriter, such as the Correcting Selectric ® typewriter manufactured by International Business Machines Corporation, the assignee of the present application.

BACKGROUND ART

The earlier types of materials employed for correcting errors on a typed page were gum erasers. The ink composition on the typewriter ribbon in use at that time was absorbed into the paper and attempts at erasure of a typed character often resulted in tearing the paper on which the error was typed. The development of nonabsorbent ink compositions of transfer materials which did not wet or dye the paper onto which typed images are printed made it possible to remove erroneously typed characters with an adhesive.

A useful known method to correct erroneously typed images is to provide in a typewriter, such as that designed as the Correcting Selectric ® typewriter model manufactured by International Business Machines Corporation, a typing operation and a pressure sensitive adhesive ribbon which can be fed by such feed mechanism to supplant the ribbon for a correction operation. In this type of operation, the erroneous image is overstruck using the appropriate type or key. The pressure sensitive ribbon is retained, spaced from the copy sheet to be corrected except in impressed areas which adhere to the erroneously typed image and lift the erroneously typed image from the substrate when typing pressure is released. Thereafter, the correct image is typed in place of the removed erroneously typed image. As referred to above, this type of operation is especially used in association with imaging compositions which are dry and are substantially free from oils and free from dissolved dyes which can migrate into the substrate and stain the paper fibers.

Although such pressure sensitive correction ribbons are in current commercial use, they do present some crucial problems. For instance, many of the commercially available pressure sensitive ribbon compositions tend to stick to the transfer ribbon, to the ribbon guides, and card holder, which is undesirable from the standpoint of effectively and efficiently operating a typewriter. Moreover, certain feed problems exist due to the high take-up and unwind tension necessary with the ribbons now commercially available. Furthermore, in view of the adhesive characteristics of the presently known correction tapes, picking up of paper fibers during correction occurs sometimes. Also, coning and telescoping of unwound spools can occur when employing presently available lift-off correction ribbons.

Many of the presently available compositions suggested for pressure sensitive materials for removing erroneous type either involve the use of relatively large amounts of inert, finely divided fillers, such as titanium dioxide, in order to reduce the surface tack, or include the use of a sticky adhesive layer in combination with a passive surface layer over the sticky layer. The sticky layer is activated with application of typing pressure. Those compositions which require the use of a tacky adhesive layer and a passive boundary layer involve more elaborate and costly methods of preparation.

Those compositions that include the use of large amounts of inert filler material suffer from the disadvantage that the filler material does not impart any adhesive properties to the compositions and, therefore, reduces the overall efficiency of the correction material, the degree of which depends upon the relative amount of filler material employed. In addition, it is often difficult to obtain a uniform dispersion of the filler material throughout the composition which can result in a considerable amount of variation in the performance of the correction material.

DISCLOSURE OF INVENTION

The characteristics needed to provide a composition which can be commercially utilized to remove erroneously typed characters and especially in conjunction with a ribbon feed mechanism requires a delicate balancing of a number of critical properties. For instance, the composition must have sufficient adhesive characteristics so as to remove the erroneously typed character from the paper, yet not be so adherent as to remove paper fibers, or cause problems with respect to feeding, and handling.

The present invention provides a low tack adhesive composition that is essentially homogeneous and uniform throughout. The adhesive characteristics of the compositions of the present invention are such that there is adequate adhesive power to remove erroneously typed characters when forcibly impacted onto such characters while at the same time are not tacky or sticky under low force engagement conditions. Accordingly, the compositions of the present invention make possible the elimination of feed problems and handling problems.

Also, the compositions of the present invention do not stick tightly to the copy sheet, and, therefore, provide efficient eradication without the picking up of paper fibers during the correction operation. The compositions of the present invention remove the erroneously typed character without disturbing the other images on the substrate.

The adhesion characteristics of the adhesive of the present invention are such that the adhesive upon deposition upon a film support tenaciously adheres to the support. In addition, it is preferred that the adhesive, when the lift-off member is a tape wound upon itself, does not strongly adhere to the backside of the substrate.

The compositions of the present invention further provide temperature stability and resistance to aging. A further advantage of the present invention is that the compositions can be coated in a one-pass operation. The low tack adhesive composition of the present invention does not require, although it can employ, if desired, inert filler materials. It is quite apparent from all of the necessary requirements that obtaining compositions which fulfill these particular aspects is a difficult task.

The low tack pressure sensitive composition of the present invention comprises:

(a) about 15 to about 35% by weight of polyethylene;
(b) about 20 to about 65% by weight of a hydrocarbon tackifying polymer;
(c) about 7 to about 25% by weight of a tacky isobutylene polymer having a viscosity average molecular weight (Flory) of at least about 40,000;
(d) about 10 to about 20% by weight of a copolymer of ethylene and/or propylene and a monoethylenically unsaturated ester wherein the copolymer contains from about 18 to about 40% by weight of the monoethylenically unsaturated ester; and
(e) about 0.5 to about 5% by weight of a carboxylic acid and/or ester thereof.

The present invention is also concerned with a low tack pressure sensitive lift-off correction element for removing erroneously typewritten images from a substrate. The correction element comprises a support member having coated on one side thereof the above defined low tack pressure sensitive composition. The low tack pressure sensitive lift-off correction element is preferably in the form of a ribbon or tape wound upon itself and can be supplied inside a cartridge having a slit sized for passage of the tape therethrough. The support member is an impact compressible layer.

The present invention is also concerned with a method for the selective removal of an erroneously typed image or character from a substrate such as paper which comprises placing over the image to be removed a low tack pressure sensitive correction element of the type defined hereinabove. The pressure sensitive composition is placed adjacent the erroneously typed image to be removed. The process includes typing against the back of the support member with a type face which corresponds to the erroneously typed image to be removed and in a location which corresponds to the position or location of the erroneously typed image. This causes the pressure sensitive lift-off correction element to be pressed against the erroneously typed image and to cause the pressure sensitive composition thereon to adhere to the erroneously typed image. Then, the correction element is separated from the substrate on which the erroneously typed image was present to thereby remove the erroneously typed image from the substrate whereby it adheres to the correction element. This is accomplished without the correction element adhering to or disturbing the other images on the substrate or removing paper fibers. After the erroneously typed character is removed from the substrate, then the desired character can be typed in its place.

BEST AND VARIOUS MODES FOR CARRYING OUT INVENTION

The low tack pressure sensitive composition of the present invention includes polyethylene. The polyethylene can be a wax and/or resin. The polyethylene waxes generally have melting points of about 85° to about 130° C. and a melt viscosity of from 2 to 300 centipoise at 150° C., and have specific gravities of about 0.91 to about 0.92.

The polyethylene resin which can be employed according to the present invention is preferably one which has a molecular weight below that for extrusion grade polyethylenes and has a specific gravity of 0.86 to 0.94, and generally has a softening point of less than about 150° C. A suitable polyethylene to employ in the present invention is polyethylene AC-6 from Allied Chemical and is a linear polyethylene having a softening point of about 222° F., a hardness of about 4 mm, a specific gravity of about 0.92, a viscosity of 350 centipoise at 140° C.

The polyethylene is employed in amounts of about 15 to about 35% and preferably about 20 to about 35% by weight. It is believed that the polyethylene tends to lower the solution viscosity and surface tack of the composition.

The compositions of the present invention must also include a tackifying polymer to impart adhesive properties to the composition. Such preferably is a hydrocarbon polymer. The preferred tackifying polymers employed according to the present invention are the terpene polymers, such as the polymeric materials including the dimers as well as higher polymers obtained by polymerization and/or copolymerization of terpene hydrocarbons, such as the acyclic, monocyclic, and bicyclic monoterpenes and their mixtures, including allo-ocimene, carene, isomerized pinene, pinene, dipentene, terpinene, terpinolene, limonene, turpentine, a terpene cut or fraction and various other terpenes. The preferred polyterpenes employed according to the present invention have softening points of up to about 100° C. and preferably about 50° to about 65° C. The polyterpenes are commercially available under the trade designations Piccolyte and Zonarez with a particularly preferred polyterpene being Piccolyte S-55.

Other hydrocarbon tackifying resins can be prepared by polymerization of monomers consisting primarily of olefins and diolefins and include, for example, the residual by-product monomers resulting from the manufacture of isoprene. Examples of such commercially available resins of this type are Wingtack Resin available from Goodyear Tire and Rubber Company, and Stay-Tack, Nirez and Betaprene H resins available from Reichhold Chemical Corporation.

The tackifying polymer is employed in amounts from about 20 to about 65% and preferably about 35 to about 50% by weight. Mixtures of tackifying polymers can be employed if desired.

Another required component of the composition of the present invention is an isobutylene polymer. The isobutylene polymer must have a viscosity average molecular weight (Flory) of at least about 40,000. Isobutylene polymers having viscosity average molecular weights (Flory) lower than about 40,000 are not satisfactory for the present invention, since such do not provide the necessary resistance to high temperature exposure required by the present invention. It is believed that the isobutylene polymer imparts adhesive properties to the compositions as well as serving as a binder for the composition. The isobutylene polymer can be a homopolymer or may be a copolymer containing relatively small amounts (e.g. up to about 5% by weight) of copolymerizable monoethylenically unsaturated monomers such as styrene.

The homopolymers of polyisobutylene are preferred. The preferred polyisobutylenes employed according to the present invention have viscosity average molecular weights (Flory) of less than about 900,000. An especially suitable isobutylene polymer is one available under the trade designation Vistanex polyisobutylene LM/MH from Exxon Chemicals. This polyisobutylene has a viscosity molecular weight (Flory) of about 46,000 and a viscosity average molecular weight (Staudinger)

of about 10,000 to about 11,700. This polyisobutylene is a clear, very viscous, tacky semisolid and is designated by the manufacturer as being medium hard.

The isobutylene polymer is employed in amounts of about 7 to about 20% by weight, and most preferably about 15 to about 20% by weight. Mixtures of isobutylene polymers can be employed, if desired.

Another required component of the composition of the present invention is a copolymer of an olefin and a monoethylenically unsaturated ester. The olefin is ethylene and/or propylene. The monoethylenically unsaturated ester is a vinyl ester of a monocarboxylic saturated ester, such as acetic acid or propionic acid and/or an alkyl acrylate wherein the alkyl group is methyl, ethyl, butyl, and the like. The preferred copolymers are the ethylene-vinylacetate copolymers. The copolymers suitable for the present invention contain about 18 to about 40% by weight of the monoethylenically unsaturated ester. Such copolymers are commercially available, such as under the trade designation Elvax from Du Pont. The copolymers generally have an inherent viscosity measured at 30° C. with 0.25 grams per 100 ml. of toluene of about 0.54 to 1.05, and a melt index (grams/10 minutes ASTMD-123A) of about 2 to about 400. Mixtures of these copolymers can be employed, if desired.

The copolymers are employed in the composition in amounts of about 10 to about 20% by weight, and preferably about 10 to about 15% by weight.

In addition, the compositions must include an organic carboxylic acid and/or ester thereof. It has been found, according to the present invention, that the presence of the acid and/or ester provides for improved eradication and improved resistance to change in eradication properties with temperature changes (e.g. from 60° to 120° F.) The carboxylic acids and esters employed are non-volatile at normal room temperature, and generally contain at least 8 carbon atoms. Usually the acids and esters have a maximum of 30 carbon atoms and are non-polymeric esters. Mixtures of acids and/or mixtures of esters can be employed when desired. The acids can be mono or poly carboxylic acids, can be straight or branched chain aliphatic acids, and can be saturated as well as being ethylenically unsaturated, and can contain aromatic groups. The esters can be from mono or polyhydric alcohols, and preferably from saturated aliphatic alcohols. Examples of some suitable carboxylic acids include oleic acid and stearic acid. Examples of suitable esters include alkylphthalates, such as, for example, di(2-ethylhexyl)phthalate, butyl ethylhexylphthalate, didecylphthalate, butyl benzylphthalate, and dibutylphthalate; alkylhexahydrophthalates, such as di(2-ethylhexyl)hexahydrophthalate; alkyl adipates, such as di(2-ethylhexyl) adipate and didecyl adipate; oleic acid esters, such as octyl oleate, butyl cellosolve oleate (i.e. ethylene glycol monobutyl ether oleate), and methyl oleate; alkyl azelates, such as didecyl azelate; sebacic acid esters such as dibutyl sebacate; stearic acid esters, benzoic acid esters; abietic acid esters; and oxalic acid esters. Also oils composed mainly from higher aliphatic acid esters, such as castor oil, can be employed. The preferred esters include di(2-ethylhexyl)phthalate, dibutyl sebacate, butyl cellosolve oleate; and castor oil. The most preferred ester is di(2-ethylhexyl)phthalate. The acid and/or ester is present in amounts of about 0.5 to about 5% by weight and preferably about 0.5 to about 3% by weight.

The above relative amounts for the various ingredients are based upon the total amounts of the polyethylene, tackifying polymer, isobutylene polymer, olefin copolymer, and acid and/or ester present in the compositions.

In addition, the compositions of the present invention can contain various modifying or auxiliary agents, such as stabilizers, and inert fillers. For instance, the compositions may contain up to about 10% by weight of an inert filler such as titanium dioxide or calcium carbonate in order to further enhance the antiblocking characteristics of the composition. However, as discussed hereinabove, inert fillers are not necessary and are not even preferred. Moreover, it may be desirable to include about 0.1 to about 1.5% by weight and preferably from about 0.25 to about 1% by weight of one or more antioxidants or stabilizers. Some suitable antioxidants include tris(di-t-butyl-p-hydroxybenzyl)-trimethylbenzene available under the trade designation Naugawhite; zinc dibutyl-dithiocarbamate available under the trade designation Butyl Zimate; 4,4'-methylene bis (2,6-diterbutylphenyl); tetrakis[methylene-3-(3',5'-ditertbutyl-4 hydroxyphenyl)-propionate]methane available under the trade designation Irganox 1010; lauryl stearyl thiodipripionate; dilauryl 3,3'-dithiopropionate; and distearyl thiodipropionate; and 2,6-ditertbutyl-p-cresol. The preferred stabilizers employed according to the present invention are distearyl thiodipropionate and Irganox 1010. It is most preferred to employ mixtures of these two stabilizers.

The backing or substrate to which the compositions of the present invention are applied are extrusion grade polyesters, such as polyethyleneterephthalate, which is available under the trade designation Mylar, polyethylenes, and cellophane. The preferred substrates are the polyesters and polyethylene. The substrate generally has a thickness of about 0.8 to about 1.5 mils and the total thickness of the composition and substrate is generally a maximum of about 3 mils. Usually, the composition is coated in a thickness of about 1.1 mils on the substrate.

The components of the composition are admixed and melted at a sufficiently high temperature, such as at about 250° to about 350° F., and preferably at about 300° F., in order to allow thorough mixing. The composition can then be coated using conventional hot melt coating technique, such as pumping hot molten liquid to a reverse roll coater and passing of the film substrate in contact therewith. As the hot melt composition cools it solidifies in a homogeneous layer over the surface of the film. It should be noted, however, that if inert filler is present, such will be the only nonhomogeneous ingredient in the composition. The bulk composition can then be subsequently slit and spooled for insertion into a supply cartridge.

If desired, the tape can be back-coated with a nonstick release surface to further insure that the adhesive layer will not stick to the reverse side of the plate when spooled or rolled, and particularly at relatively high temperatures, such as about 140° F. Some suitable known nonstick or release coatings include cured silicon resins and polyvinyl N-octadecylcarbamate. The nonstick layers can be applied or deposited from a solution form and is usually applied in amounts up to about 50 mg per square meter of substrate.

The compositions of the present invention are of such low tack that the commonly used test method referred to as the rolling-ball tack test does not provide a value which is not off the scale. Accordingly, the compositions of the present invention have been tested according to the following procedure:

Mylar substrates about 0.280 inches wide are coated with the composition to be tested at a thickness of about 1.1 mils to provide the testing tapes. The tape is pressed adhesive side down on a stainless steel plate cleaned with acetone, using a five pound rubber roller. The samples are allowed to stand at room temperature for about 20 minutes. The force required in pounds to peel off the tape samples at an angle of 180 degrees and a rate of twelve inches per minute is measured. The average of 10 readings is taken.

Typical average values of tack measurements for at least the more preferred compositions of the present invention are about 0.03 to 0.07 pounds. Tacky and high tack compositions now commercially available for removing erroneously typed images typically have values of about 0.5 pounds and higher. The preferred compositions have Brookfield viscosity at 270° F. and 4 rpm in the range of about 3500 to about 4000 centipoise.

The following non-limiting examples are presented to further illustrate the present invention.

EXAMPLE 1

A composition containing about 25 parts by weight of polyethylene AC-6 from Allied Chemical Corporation, about 15 parts by weight ethylene vinyl acetate polymer (Elvax 210); about 42 parts by weight polyterpene resin (Piccolyte S-55); about 18 parts by weight of polyisobutylene (Vistanex LM/MH); and 2 parts by weight of di(2-ethylhexyl)phthalate is prepared. To this composition is added about 0.5 parts by weight of distearyl thiodipropionate and about 0.5 parts by weight of tetrakis[methylene-3-(3', 5'-di-t-butyl-4-hydroxyphenyl)-propionate]methane. The composition is coated by a hot melt technique onto one side of a 1.5 mil polyester film (mylar) in a thickness of about 1.1 mils. The other side of the polyester substrate is coated with a cross-linked silicone release coat.

The coated film is wound and tested on a Correcting Selectric ® typewriter. It removes the desired typed images without picking up paper fibers. The composition has a low tack value in the range referred to hereinabove (i.e. 0.03–0.07 pounds).

EXAMPLE 2

Example 1 is repeated except that the composition contains about 26.6 parts by weight of the polyethylene, about 13.3 parts by weight of the ethylene-vinyl acetate copolymer, about 42 parts by weight of the polyterpene, about 18 parts by weight of polyisobutylene, about 1 part by weight of di(2-ethylhexyl) phthalate, and the same amount and types of stabilizer as in Example 1. The results obtained, although quite acceptable, are not quite as good as those of Example 1 with respect to eradication.

EXAMPLE 3

Example 1 is repeated except that about 2 parts by weight of dibutyl phthalate is employed in place of the di(2-ethylhexyl)phthalate. The results obtained, although quite acceptable, are not as good as those of Example 1 with respect to eradication and resistance to change or eradication due to temperature change.

EXAMPLE 4

Example 1 is repeated except that about 2 parts by weight of octyl oleate is employed in place of the di(2-ethylhexyl)phthalate. The results obtained, although quite acceptable, are not as good as those of Example 1 with respect to eradication and resistance to change or eradication due to temperature change.

EXAMPLE 5

Example 1 is repeated except that about 2 parts by weight of oleic acid is employed in place of the di(2-ethylhexyl)phthalate. The results obtained, although quite acceptable, are not as good as those of Example 1 with respect to eradication and resistance to change of eradication due to temperature change.

EXAMPLE 6

Example 1 is repeated except that about 2 parts by weight of dibutyl sebacate is employed in place of the di(2-ethylhexyl)phthalate. The results obtained are similar to those of Example 1.

EXAMPLE 7

Example 1 is repeated except that about 2 parts by weight of castor oil is employed in place of the di(2-ethylhexyl)phthalate. The results obtained are similar to those of Example 1.

EXAMPLE 8

Example 1 is repeated except that about 2 parts by weight of butyl cellosolve oleate is employed in place of the di(2-ethylhexyl)phthalate. The results obtained are similar to those of Example 1.

COMPARISON EXAMPLE 9

Example 1 was repeated without the phthalate. The eradication and change in eradication characteristics were inferior to those obtained in any of the above examples.

What is claimed is:

1. A low tack pressure sensitive composition comprising:
   (a) about 15–35% by weight of polyethylene;
   (b) about 20–65% by weight of a hydrocarbon tackifying polymer;
   (c) about 7–25% by weight of a tacky semi-solid isobutylene polymer having a viscosity average molecular weight (FLORY) of at least about 40,000;
   (d) about 10–20% by weight of a copolymer of an olefin selected from the group of ethylene, propylene, or mixtures thereof; and a monoethylenically unsaturated ester wherein the copolymer contains about 18 to about 40% by weight of said ester; and
   (e) about 0.5 to about 5% by weight of a nonvolatile carboxylic acid, or ester thereof or mixture thereof.

2. The composition of claim 1 wherein said polyethylene has a specific gravity of about 0.91 to 0.92.

3. The composition of claim 1 wherein said polyethylene is employed in amounts of about 20 to about 35% by weight.

4. The composition of claim 1 wherein said tackifying polymer is a polyterpene.

5. The composition of claim 1 wherein said tackifying polymer is a polyterpene having a softening point up to about 100° C.

6. The composition of claim 1 wherein said tackifying polymer is a polyterpene having a softening point of about 50° to about 65° C.

7. The composition of claim 1 wherein the tackifying polymer is employed in amounts of about 35 to about 50% by weight.

8. The composition of claim 1 wherein said isobutylene polymer is a polyisobutylene.

9. The composition of claim 1 wherein said isobutylene polymer is a polyisobutylene having a viscosity molecular weight (Flory) of about 46,000 and a viscosity average molecular weight (Staudinger) of about 10,000 to about 11,700.

10. The composition of claim 1 wherein the isobutylene polymer is employed in amounts of about 7 to about 20% by weight.

11. The composition of claim 1 wherein the isobutylene polymer is employed in amounts of about 10 to about 20% by weight.

12. The composition of claim 1 wherein said copolymer is a copolymer of ethylene and vinyl acetate.

13. The composition of claim 1 wherein said copolymer if employed in amounts of about 10 to about 15% by weight.

14. The composition of claim 1 which contains up to about 10% by weight of an inert filler.

15. The composition of claim 14 wherein said inert filler is titanium dioxide, calcium carbonate, or mixtures thereof.

16. The composition of claim 1 which contains about 0.1 to about 1.5% by weight of an antioxidant.

17. The composition of claim 1 which contains about 0.25 to about 1% by weight of an antioxidant.

18. The composition of claim 16 wherein said antioxidant is a mixture of tetrakis[methylene-3-(3',5'-di-t-butyl-4-hydroxyphenyl)propionate]methane and distearyl thiodipropionate.

19. The composition of claim 1 which contains about 25 parts by weight of polyethylene, about 15 parts by weight of an ethylene-vinylacetate copolymer, about 42 parts by weight of a polyterpene, about 18 parts by weight of a polyisobutylene, and about 2 parts by weight of said acid or ester or mixture thereof.

20. The composition of claim 19 wherein said component (e) is di(2-ethylhexyl)phthalate.

21. The composition of claim 1 wherein said component (e) is di(2-ethylhexyl)phthalate.

22. The composition of claim 1 wherein component (e) is selected from the grou of di(2-ethylhexyl) phthalate; dibutyl phthalate, octyl oleate, dibutyl sebacate, ethylene glycol monobutyl ether oleate; oleic acid, castor oil and mixtures thereof.

23. The composition of claim 1 wherein component (e) is selected from the groupp of di(2-ethylhexyl) phthalate, dibutyl sebacate, ethylene glycol monobutyl ether oleate, castor oil and mixtures thereof.

24. A low tack pressure sensitive lift-off correction element for removing typewritten characters from a substrate which comprises a support member having coated on one side thereof the composition of claim 1.

25. The correction element of claim 24 being in the form of a tape wound upon itself.

26. The correction element of claim 24 wherein said support member is selected from the group of polyethyleneterephthalate, polyethylene, and cellophane.

27. The correction element of claim 24 wherein said support member is polyethyleneterephthalate.

28. The correction element of claim 24 wherein said substrate has a thickness of about 0.8 to about 1.5 mils and the total thickness of the composition and substrate is a maximum of about 3 mils.

29. The correction element of claim 24 wherein the composition is coated on said support member in a thickness of about 1.1 mils.

30. The correction element of claim 24 which has on the side not coated with the composition of claim 1 a non-stick release coating.

31. A method for selective removal of an erroneously typed image from a substrate which comprises placing over said image a low tack pressure sensitive lift-off correction element of claim 24 wherein the pressure sensitive composition is adjacent said erroneously typed image to be removed, and typing against the back of support member with a type face corresponding to the erroneous image to be removed and in a location corresponding to the position of said erroneous image to cause said pressure sensitive lift-off correction element to be pressed against said erroneous image and to cause said pressure sensitive composition to adhere to said erroneous image, and separating said correction element form said substrate whereby said erroneous image remains adhered to said correction element and is removed from said substrate without the correction element adhering to or disturbing the other images on the substrate.

* * * * *